United States Patent [19]
Carr et al.

[11] Patent Number: 5,189,323
[45] Date of Patent: Feb. 23, 1993

[54] ROTARY, VERTICAL-DRIVE, TETHERED MICROMOTOR

[75] Inventors: Willian N. Carr, Wayne, N.J.; Hong Yu, San Jose, Calif.; Dong-Il D. Cho, Princeton Junction, N.J.

[73] Assignee: The Trustees of Princeton University, Princeton Junction, N.J.

[21] Appl. No.: 810,395

[22] Filed: Dec. 19, 1991

[51] Int. Cl.$^5$ .............................................. H02K 1/22
[52] U.S. Cl. .............................. 310/40 MM; 310/90; 310/268
[58] Field of Search .................... 310/40 MM, 309, 90, 310/268

[56] References Cited

U.S. PATENT DOCUMENTS

| | | | |
|---|---|---|---|
| 4,736,127 | 4/1988 | Jacobsen | 310/308 |
| 4,943,750 | 7/1990 | Howe et al. | 310/309 |
| 5,001,381 | 3/1991 | Watanable | 310/309 |
| 5,043,043 | 8/1991 | Howe et al. | 356/645 |

OTHER PUBLICATIONS

"IC-Processed Micro-Motors: Design, Technology and Testing", IEEE Solid State Sensor and Actuator-Workshop, IEEE Catalog No. 90CH2783-9, (1990) pp. 1-6.
"Friction and Wear in Microfabricated Harmonic Side-Drive Motors," IEEE Solid State Sensor and Actuator Workshop, IEEE Catalog No. 90CH2783-9, pp. 17-22.
"Principals in design and microfabrication of variable-capacitance side-drive motors, Journal of Vacuum Science Technology", A8(4), Jul.-Aug. 1990, pp. 3414-3424.

Primary Examiner—Steven L. Stephan
Assistant Examiner—Matthew Nguyen
Attorney, Agent, or Firm—Perman & Green

[57] ABSTRACT

An electrostatically operated micromotor is described that includes a rotor having first and second major surfaces, an axis of symmetry, and conductive portions. First and second annular, segmented torque stators are disposed adjacent the first and second major surfaces of the rotor and a bearing tethers the rotor to a support surface. Circuitry connects to each electrode of each torque stator for applying phased signals that induce a rotational force in the rotor. Such phased signals applied to electrodes of the first torque stator differ in potential from phased signals applied to electrodes of the second torque stator, so as to electrostatically balance the rotor, whereby net forces exerted by the rotor on the bearing in the direction of the axis of symmetry are lessened.

9 Claims, 4 Drawing Sheets

ROTARY, VERTICAL-DRIVE, TETHERED MICROMOTOR

FIELD OF THE INVENTION

This invention relates to micromachines and, more particularly, to a rotary micromotor that employs a balanced stator structure to achieve improved rotor operation and torque characteristics.

BACKGROUND OF THE INVENTION

Silicon micromachining has been developed over the last decade as a means for accurately fabricating small structures without requiring assembly of discrete components. Such processing generally involves selective etching of a silicon substrate and depositions of thin-film layers of semiconductor materials. Recently, silicon micromachining has been applied to the fabrication of structures that include a rotary or linear bearing, which bearings allow substantially unrestricted motion of a moving component in one degree of freedom. Such bearings have enabled the development of electrically-driven motors, referred to herein as micromotors. Such micromotors have a planar geometry, with gap separations on the order of 1-2 microns and lateral dimensions on the order of 100 microns or more.

The small sizes of such micromotors and the characteristics of silicon micromachining combine to produce electro-mechanical characteristics which significantly differ from those of conventional motors. Electrostatic forces are generally found to be larger than the magnetic alternatives for devices scaled to micro-dimensions. The use of micro-size field-generating structures, enables increased strength electromagnetic fields to be created.

Recently, Tai et al. have reported the fabrication of a micromotor including a rotor pinned to a substrate or stator by a central bearing that restricts its lateral and axial motion. See "IC-Processed Micro-Motors: Design, Technology and Testing", IEEE Solid State Sensor and Actuator Workshop, Hilton Head Island, South Carolina, June 4-7, IEEE Catalogue No. 90CH2783-9 (1990), pages 1-6. The entire structure shown by Tai et al. was micromachined from silicon using deposition and etching steps.

The manner of energization of the Tai et al rotor is via a variable-capacitance, side-drive arrangement, wherein stator poles are arranged about the periphery of the rotor. By appropriate energization of the side-disposed stator poles using a multi-phase signal, rotation of the rotor is achieved. Further details of this structure can be found in the following two papers by Mehregany et al., "Friction and Wear in Microfabricated Harmonic Side-Drive Motors", IEEE Solid State Sensor and Actuator Workshop, Hilton Head Island, South Carolina, June 4-7, IEEE Catalogue No. 90CH2783-9, pages 17-22 and "Principles in Design and Micro Fabrication of Variable Capacitance Side-Drive Motors", Journal of Vacuum Science Technology, A8(4), July/August 1990, pages 3414-3424.

The side-drive micromotor is the simplest electrostatic micromotor. Torque is derived via position-dependent capacitance between the rotor and stator poles. However, because of the side-by-side arrangement of the rotor and stator poles, field coupling is less than optimal and, as a result, the torque characteristics of the motor suffer. Furthermore, the rotor still experiences significant frictional engagement between itself and the central bearing that pins it to the substrate.

It is an object of this invention to provide an improved micromotor that exhibits lessened frictional losses.

It is another object of this invention to provide an improved micromotor exhibiting increased rotor-torque characteristics.

It is another object of this invention to provide an improved micromotor exhibiting a substantially linear-rotor torque characteristic.

SUMMARY OF THE INVENTION

An electrostatically operated micromotor is described that includes a rotor having first and second major surfaces, an axis of symmetry, and conductive portions. First and second annular, segmented torque stators are disposed adjacent the first and second major surfaces of the rotor and a bearing tethers the rotor to a support surface. Circuitry connects to each electrode of each torque stator for applying phased signals that induce a rotational force in the rotor. Such phased signals applied to electrodes of the first torque stator differ in potential from phased signals applied to electrodes of the second torque stator, so as to electrostatically balance the rotor, whereby net forces exerted by the rotor on the bearing in the direction of the axis of symmetry are lessened.

DETAILED DESCRIPTION OF THE INVENTION

Figure 1:
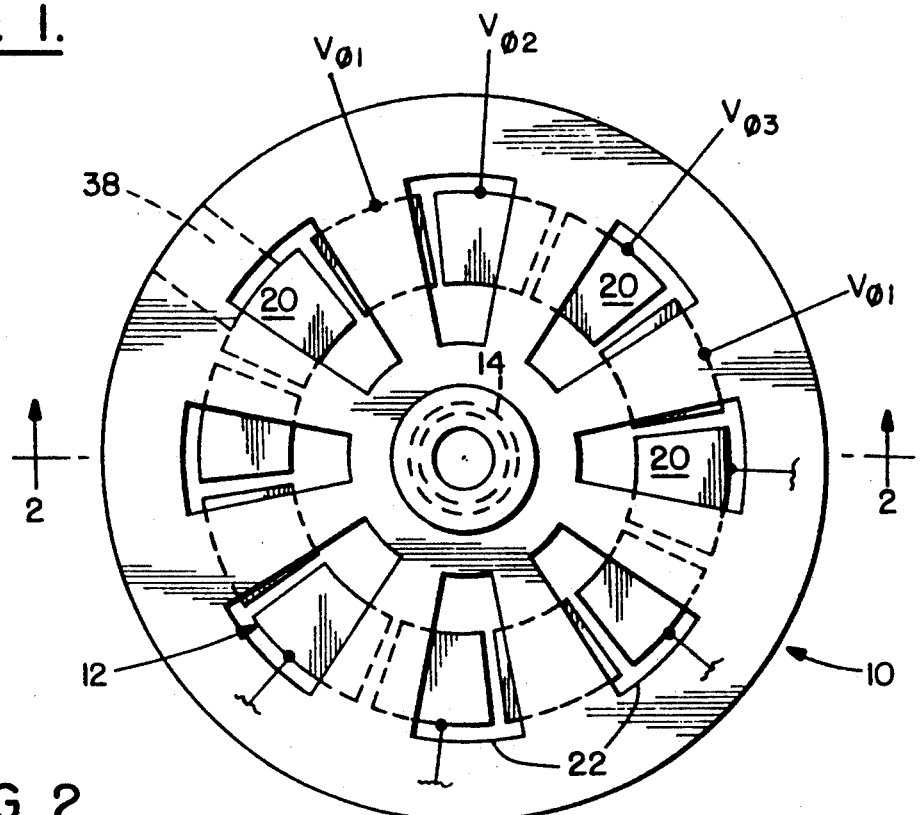
FIG. 1 is a schematic plan view of a micromotor incorporating the invention hereof, with an upper stator removed, but showing the rotor and an underlying torque stator.
Figure 2:
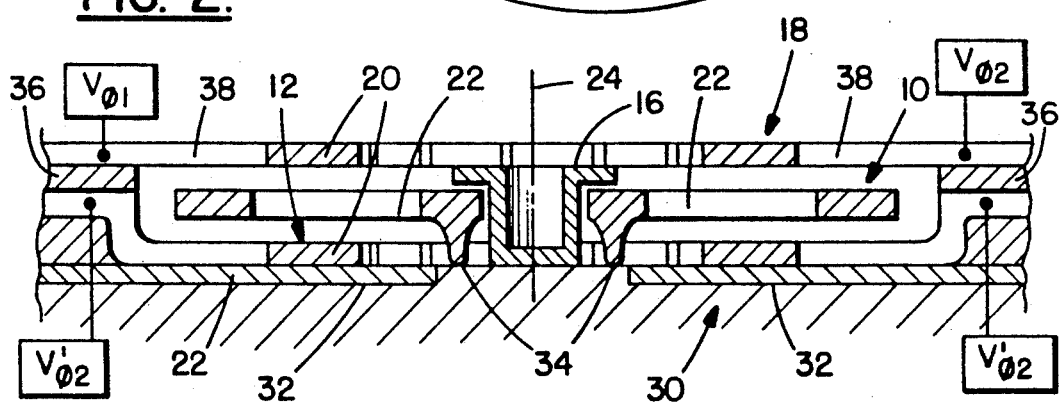
FIG. 2 is a sectional view of the micromotor of FIG. 1 showing both torque stators and a rotor disposed therebetween.

In FIG. 1, a plan schematic view is shown of a micromotor including a rotor 10 and an underlying torque stator 12. An the upper torque stator has been removed but is shown in FIG. 2. A central bearing 14 (see also FIG. 2) extends through an aperture in rotor 10 and has an expanded collar 16 which maintains rotor 10 from contacting upper torque stator 18. Upper and lower torque stators 12 and 18 are each provided with a plurality of aligned, conductive electrodes 20 spaced about bearing 14 in an annulus.

Figure 3:
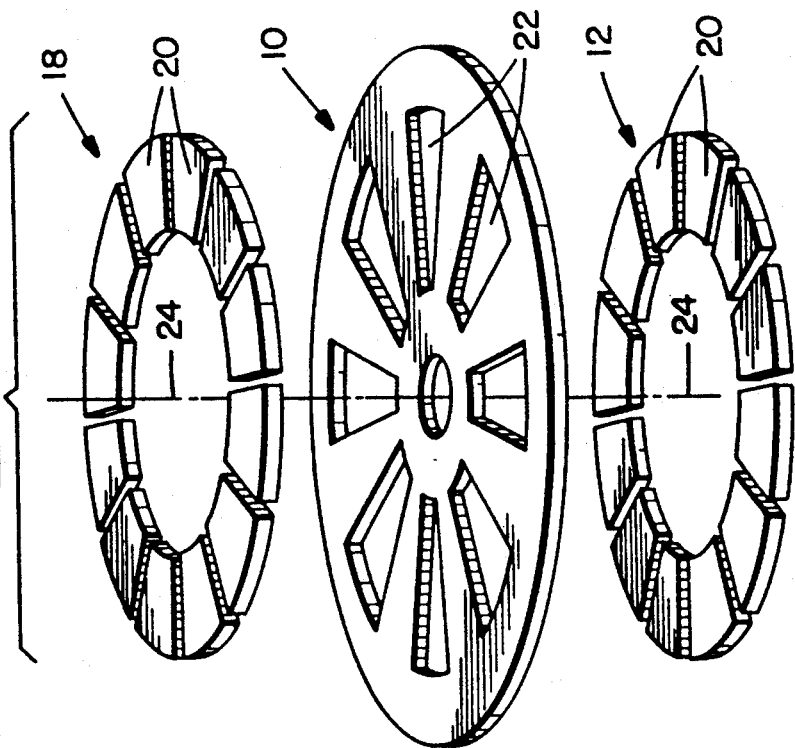
FIG. 3 is an exploded schematic view of a part of the structure of FIG. 2 showing the relationship between the torque stators and a rotor sandwiched therebetween.

The overall relationship of rotor 10 and torque stators 12 and 18 can be seen from the exploded view of FIG. 3. As can there be seen, upper and lower segmented electrodes 20 of each of torque stators 12 and 18 are aligned, and rotor 10 is sandwiched therebetween. Rotor 10 is further provided with a plurality of circularly disposed apertures 22. Rotor 10 is preferably comprised of a conductive material such as polysilicon and apertures 22 create nonconductive regions about the periphery of rotor 10 which enhance a tangential field induced therein, which field enables motor action to occur. It is to be noted, that torque stators 12 and 18, as well as rotor 10, are symmetrical about axis 24.

As can be seen from FIGS. 1-3, the micromotor configuration employs torque stators which are not co-planar with the rotor and, for this reason, the micromotor is called a "vertical-drive electrostatic motor". The vertical-drive arrangement provides more torque than side drive micro motors due to the fact that the electrostatic forces are developed over an increased fringe field area. In addition, torque stators 12 and 18 provide a significant balancing action for rotor 10. If only one torque stator was used, an electrostatic force would be exerted on rotor 10 by the induced field that would exhibit a large component in the vertical direction. This force, unless countered, would tend to clamp rotor 10 to the stator, thus resulting in increased friction at the bearing. However, the vertical drive motor shown in FIGS. 1-3 employs a pair of stators 12 and 18 on either side of rotor 10 to create a balance of axial force components exerted on rotor 10. More specifically, the vertical forces between upper torque stator 18 and rotor 10 are balanced by forces between lower torque stator 12 and rotor 10, respectively.

Figure 4:
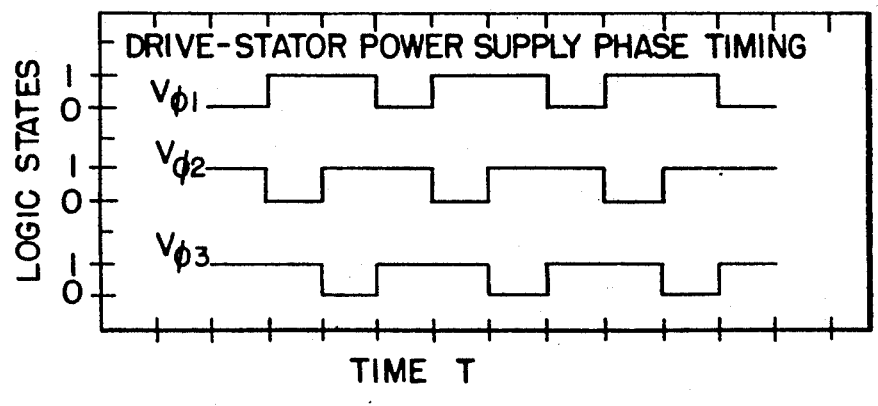
FIG. 4 is a waveform diagram showing three phase energization of the stators.

As is well known to those skilled in the art, a motor structure can be made to rotate through the use of a multiple phase energization of a stator winding. A similar scheme is used herein and is shown in FIG. 4, wherein three phase energization is illustrated. Three phase operation of the system is achieved by applying the signals shown in FIG. 4 to the stator electrodes shown in FIG. 1 (not all connections are shown, as this is conventional three phase-energization).

The application of three phase energization pulses create charge distributions on the stator electrode surfaces. Assuming that rotor 10 is comprised of a conductive material, the charge patterns on electrodes 20 will create fringing fields that induce physical forces in rotor 10. A pulse applied to an electrode creates an attractive force that tends both to pull rotor 10 towards the electrode and horizontally in the direction of the "rotation" of the applied three phase energization. As rotor 10 moves in accordance with the induced force, its charge distribution begins to align with that of the torque stator's electrodes, and the horizontal force acting on the rotor diminishes. However, by causing the stator charge pattern to also rotate, rotor 10 is caused to continue its rotating action in accordance with the applied stator energizations.

While the above described motor action is somewhat conventional, the voltage levels applied to the torque stators are not. It is important that the vertical forces exerted on rotor 10 be substantially balanced. As a result, and assuming a horizontal orientation of the micromotor, the "lower" stator has applied thereto a lesser amplitude potential then the upper stator. The upper stator thereby exerts a greater attractive force on rotor 10 and overcomes the additional downward force created by the mass of rotor 10.

As the specific values of the applied potentials depend upon the mass of rotor 10, the size of the stator electrodes, the separations existing between the rotor and the stator surfaces, and the ultimate orientation of the micromotor, specific values of voltages vary with the device geometry. The upper stator electrodes, for a device with 100 volt stator operating voltage levels, a 25 micrometer rotor radius, and a rotor-to-stator separation of two micrometers, create an upward force of approximately 10-18 Newtons. A similar downward balancing force is created between the lower stator electrodes and the rotor. One skilled in the art will realize that the ultimate aim is to electrostatically balance the rotor so that frictional forces between it and its central bearing are minimized.

Returning to FIG. 2, a silicon-based micromotor structure therein will be further described. Silicon substrate 30 provides a support for the micromotor and is generally connected to a source of common potential (not shown). An insulating silicon nitride layer 32 isolates lower stator 12 from substrate 30. Bearing 14 extends upwardly from silicon substrate 30 and is preferably comprised of a conductive material such as polysilicon. In addition to tethering rotor 10, bearing 14 also acts to provide a connection between rotor 10 and the common potential that is connected to substrate 30.

Rotor 10 is preferably comprised of polysilicon and has a pair of downwardly extending bearing surfaces 34 which act to offset rotor 10 from lower stator 12. A dielectric layer 36 isolates lower stator 12 from upper stator 18. It is to be noted that each of electrodes 20 in upper stator 18 extends over rotor 10 in a cantilever fashion and is supported by an arm portion 38. Only one such arm portion 38 is shown in FIG. 1, to avoid cluttering the view.

The three phase connections to upper and lower stators 12 and 18 are shown schematically in FIG. 2 with it being recalled that different potential levels are applied to the upper and lower stators for rotor balance purposes.

Figure 6:
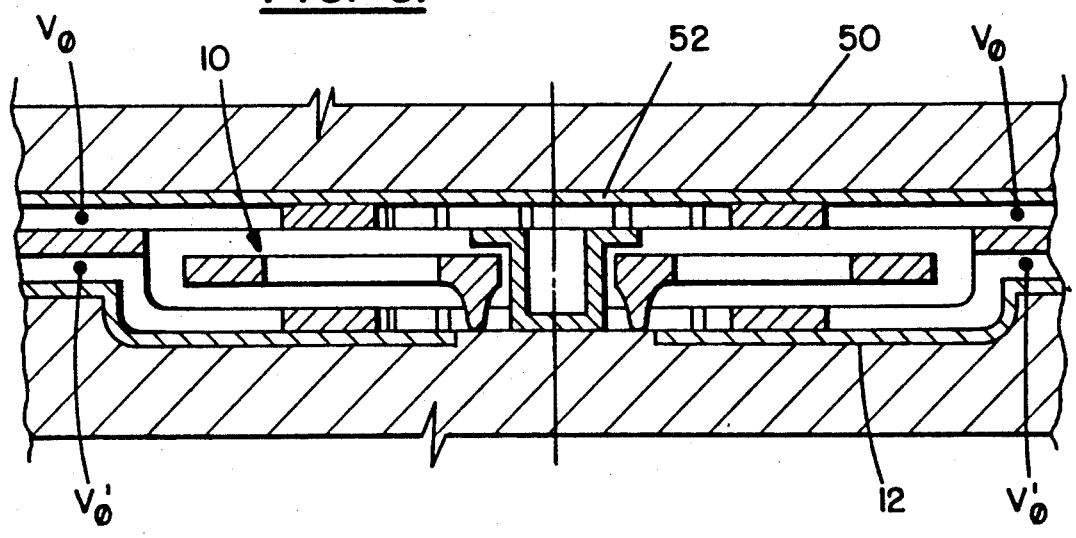
FIG. 6 is a side sectional view of another embodiment of the micromotor of FIG. 2.

A similar structure to that shown in FIG. 2 is shown in FIG. 6. However, in lieu of cantilevering upper stator 18 over rotor 10, stator 18 constructed on a substrate 50 and over dielectric layer 52. Substrate 50 is then inverted and bonded to the lower stator structure. In this manner, a more rugged micromotor structure results. If desired, an aperture can then be opened in substrate 50 and insulating layer 52 to enable access to rotor 10 (e.g. a laser beam may be used for rotation sensing purposes).

Micromachining can be employed to construct the variable-capacitance vertical/drive electrostatic micromotor shown in FIGS. 2 and 6. The micromachining essentially involves selective etching of multiple layers and deposits of films. Sacrificial low temperature oxide (LTO) layers are used and are removed at certain times in the process. It is preferred to employ the polysilicon cantilevers that are dielectrically isolated from the silicon surface by a sandwich of silicon nitride and a thermally grown layer of silicon dioxide. The polysilicon stator film can also be used to fabricate a pin bearing to further confine the rotor.

The process sequence for fabrication of the micromotor structure is a subset of the well known CMOS process. A silicon wafer (n-type) (2 ohm-cm resistivity) of "100" orientation is first oxidized to grow a 400 Angstrom-thick thermal stress-relieved silicon dioxide layer. This is followed by a 1500 Angstrom-thick LPCVD silicon nitride film, deposited by reacting dichlorosilane and ammonia at 800° C. and a pressure of 400 mT.

Figure 5:
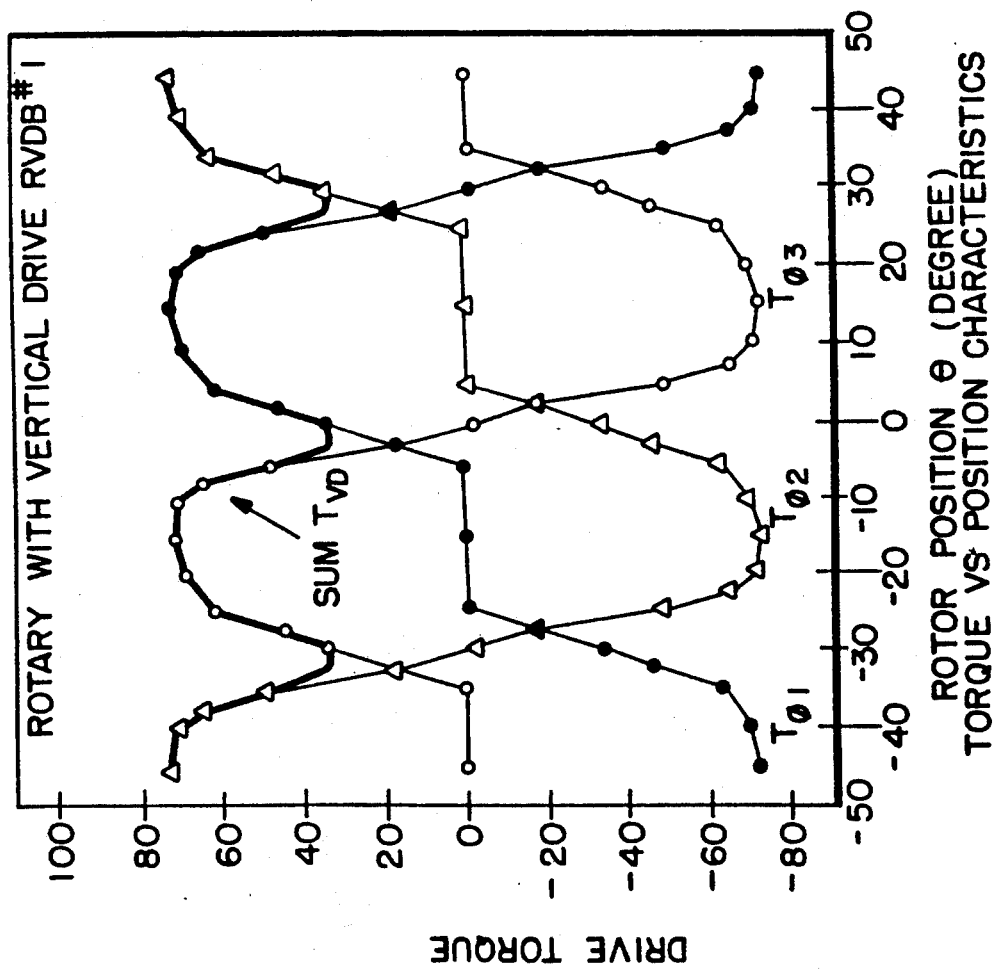
FIG. 5 is a plot of drive torque versus rotor position for the micromotor shown in FIGS. 1 and 2.

A first LTO spacer layer, 0.5 microns-thick, is then deposited at 400° C. and 250 mT with a reaction of silane and oxygen. Silane is reacted at 250 mT and 625° C., to deposit the first LPCVD polysilicon structural layer, 5000 Angstroms/thick on the LTO spacer. This polysilicon film is phosphorus/doped during a 60 minute 925° C., diffusion cycle using a POCl₃ liquid diffusion source in a nitrogen ambient. Rotor structures are then patterned and an isotropically etched in the polysilicon film using a CCl₄ plasma. A second LPCVD LTO spacer, one micron-thick is then deposited on the patterned structures nd trenches are patterned and plasma etched through both LTO layers to expose the nitride-coated substrate. A final polysilicon film, either 0.5 or 1 micron thick is then deposited and doped during a second POCl₃ diffusion cycle The second polysilicon layer is patterned and plasma etched to define the 1 micron-thick micromotor pin bearing and stator islands, as well as 0.5 micron/thick singly and doubly supported microbeams. Finally, the sandwiched patterned LTO and poly-silicon films are annealed in a nitrogen ambient at 1150° C. for 20 minutes to reduce residual stresses in the polysilicon films. A torque versus position characteristic for a motor such as shown in FIGS. 2 and 6 is shown in FIG. 5. The radius of rotor 10 is 50 microns and the air gap between the rotor and stator is 2 microns. Rotor 10 has a thickness of 2 microns and the length of each stator, in radius, is 25 microns. The ratio of stator pole number to rotor pole number is 12:8. The two sets of stator electrodes are excited with three phase pulse waves having an amplitude of 100 volts.

As shown in FIG. 5, the maximum developed torque is approximately 70 pico Newton-meters, corresponding to the maximum drive torque for a single phase. The minimum torque is 35 pico Newton-meters which is provided by simultaneous excitation of two corresponding phases at the phase crossover point. It is to be noted that the sum torque shows a substantial variation.

Figure 7:
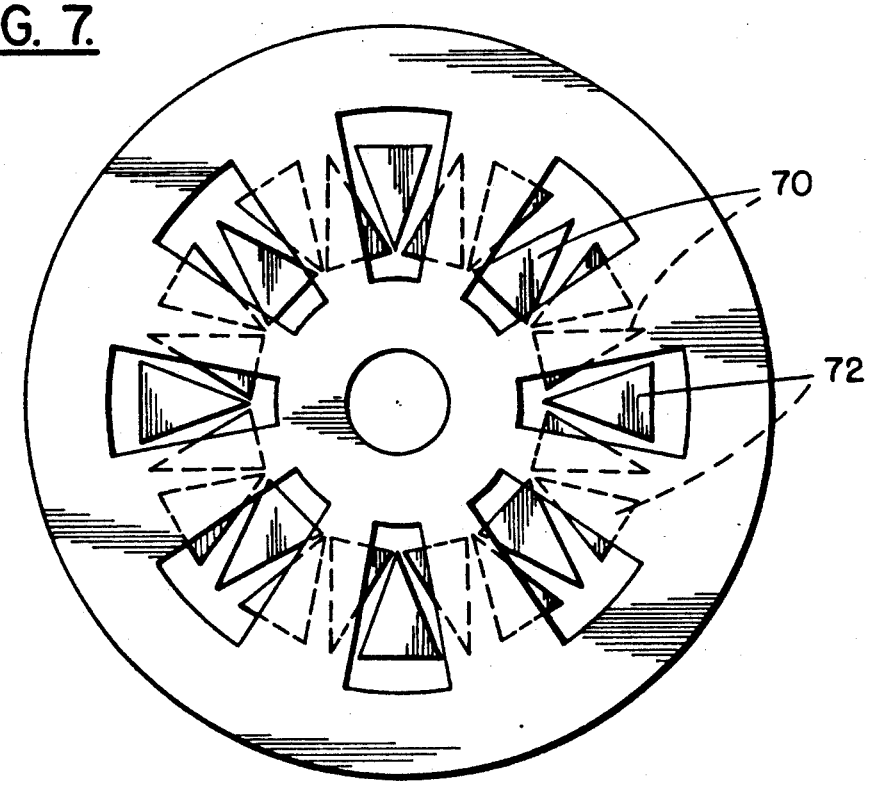
FIG. 7 is a plan view of a rotor and lower torque stator which provides improved linearity of torque.
Figure 8:
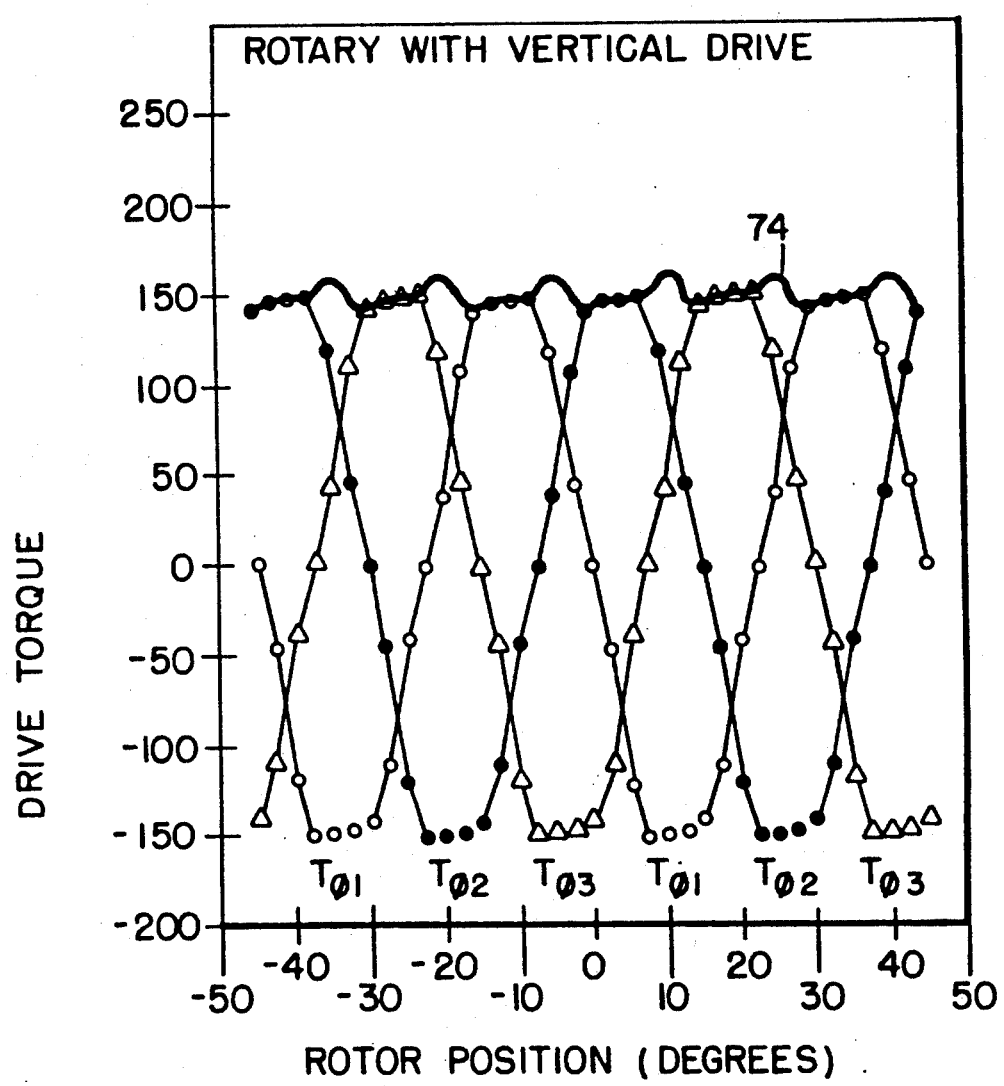
FIG. 8 is a plot of drive torque versus rotor position for the rotor/stator configuration shown in FIG. 7.

It has been found that the torque versus angular position characteristic can be substantially flattened by shaping the electrodes of the torque stators in a truncated triangular form such as is shown in FIG. 7. In FIG. 7, the upper torque stator is not shown. Each torque stator comprises two series of truncated triangular electrodes with a first series 70 being oriented apex pointed outwardly and a second interspersed series 72 being oriented with apexes pointed inwardly. po The resulting torque/rotor position plot is shown in FIG. 8 and summation curve 74 clearly demonstrates a smoother torque characteristic.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

We claim:

1. An electrostatically operable micromotor, comprising:
   a circular, conductive material rotor having first and second major surfaces, an axis of symmetry, and an annulus of apertures disposed about said axis of symmetry so as to provide non-conductive interruptions of said rotor's conductive material;
   first and second annular, segmented, torque stators respectively disposed adjacent said first and second major surfaces of said rotor and aligned with said annulus of apertures;
   bearing means for tethering said rotor to a support surface; and
   circuit means connected to each segment of each said torque stator for applying phased signals thereto to induce a rotation force in said rotor, phased signals applied to segments of said first annular torque stator adjusted to balance phased signals applied to segments of said second torque stator.

2. The electrostatically operable micromotor of claim 1, wherein said rotor is disc shaped and includes a bearing annulus concentrically located about said axis of symmetry, said bearing annulus extending from a major surface of said rotor towards said support surface.

3. The electrostatically operable micromotor of claim 1 wherein said apertures in said rotor are polygonal in shape.

4. The electrostatically operable micromotor of claim 1, wherein said first and second annular torque stators comprise a plurality of polygonal conductive electrodes arranged in an annulus about said axis of symmetry.

5. The electrostatically operable micromotor of claim 4 wherein each said torque stator comprises a first plurality of spaced first-shape electrodes and a second plurality of interspersed second-shape electrodes, said electrodes positioned to create a composite field that induces a substantially constant torque characteristic in said rotor.

6. The electrostatically operable micromotor of claim 5 wherein said first-shape electrodes are triangular with apexes pointed outwardly from said axis of symmetry, and said second shape electrodes are triangular with apexes pointed towards said axis of symmetry.

7. The electrostatically operable micromotor of claim 1, wherein said micromotor is constructed on a silicon substrate and said bearing means extends upwardly from said substrate and is electrically connected thereto.

8. The electrostatically operable micromotor of claim 7, wherein said first annular segmented torque stator resides in a recess in said semiconductor substrate and said second annular segmented torque stator extends over said rotor in a cantilevered manner.

9. The electrostatically operable micromotor of claim 7, wherein said first annular segmented torque stator resides in a recess in said substrate, and said second annular segmented torque stator is supported by an overlying semiconductor insulating substrate, said overlying substrate bonded to the underlying substrate.

* * * * *